March 1, 1966  R. W. HATCH, JR  3,237,859
FLUID LOGIC SIGNAL DURATION MEASUREMENT
Filed June 24, 1964
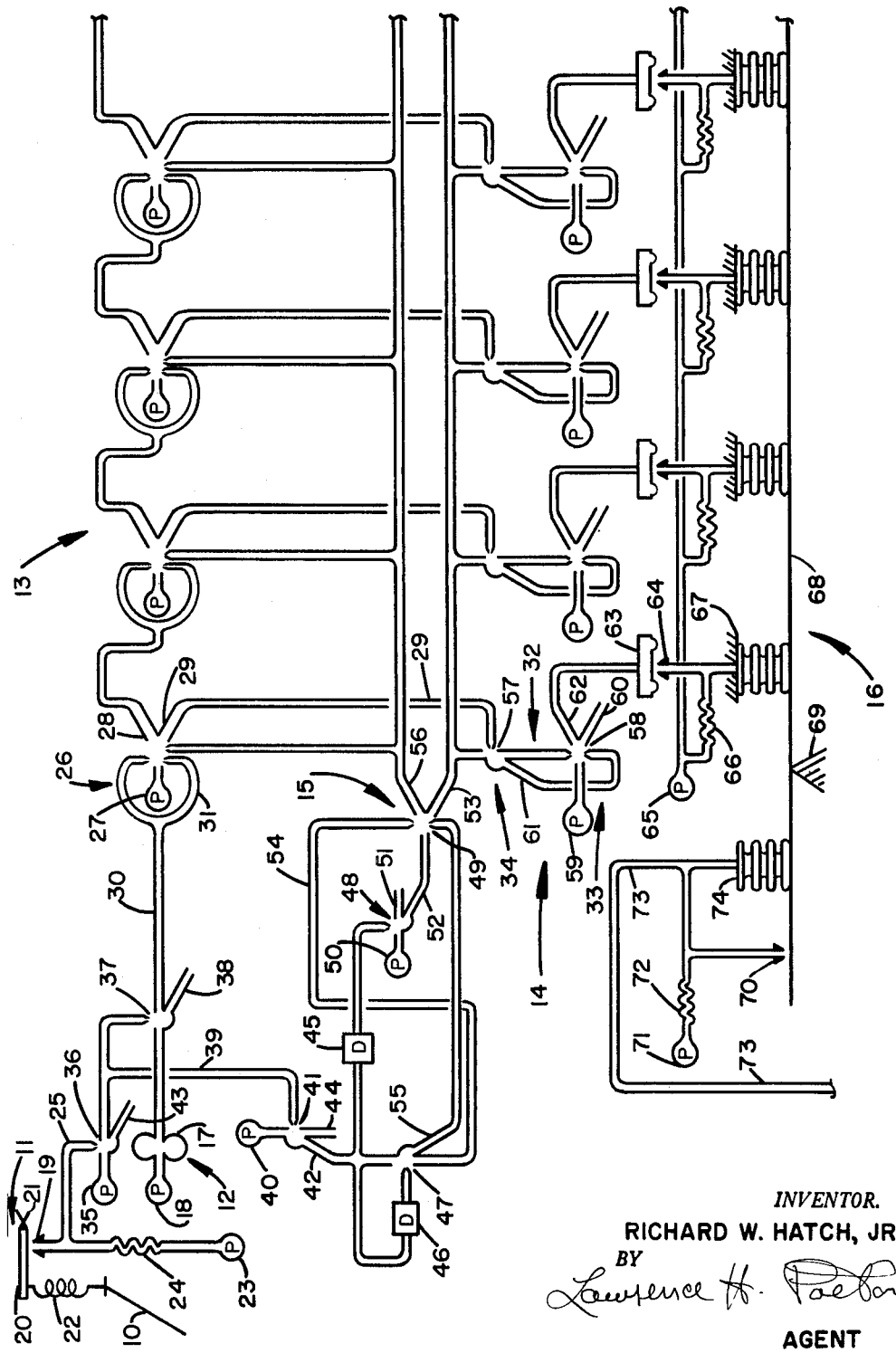
INVENTOR.
RICHARD W. HATCH, JR.
BY
Lawrence H. Poelon
AGENT

United States Patent Office 3,237,859
Patented Mar. 1, 1966

3,237,859
FLUID LOGIC SIGNAL DURATION MEASUREMENT
Richard W. Hatch, Jr., Norwell, Mass., assignor to The Foxboro Company, Foxboro, Mass., a corporation of Massachusetts
Filed June 24, 1964, Ser. No. 377,660
1 Claim. (Cl. 235—201)

This invention relates to fluid logic systems operating on a dynamic continuous flow basis. In particular, it provides means for determining the duration of a selected signal.

An application of this device is in the measurement of pulse width. This may be fluid pulse or a pulse in other form translated into a fluid pulse. One specific application is in the use of the device of this invention as a telemeter receiver. In telemeter systems the transmitted signal of the received signal is often electrical, and often direct current, in the form of a direct current step signal. In such cases the duration of this signal is representative of a variable condition measurement at the remote telemeter transmitter location.

The device of this invention, through fluid logic means, establishes a known pulse frequency situation for application to a fluid logic counter, and triggers this frequency situation in and out of the counter in accordance with signals representative of the selected beginning and ending of a pulse to be measured. By counting the known frequency pulses for a time period established by the incoming signal pulse, a representation of the incoming signal is provided on a binary output basis from the counter.

This invention provides, further, means for transferring the output of the counter into a register and into an integrator device to provide a single fluid output signal in representation of the value of the input variable condition signal.

It is therefore an object of this invention to provide new and improved signal duration measurement means.

Other objects and advantages of this invention will be in part apparent and in part pointed out hereinafter and in the accompanying drawing wherein:

The drawing is a schematic representation of a telemeter receiver operating on a fluid logic continuous flow basis, in representation of one form of application of this device and in accordance with this invention.

In the drawing the input to this telemeter receiver is indicated at the left of the drawing as at 10 as a direct current step input signal from a telemeter transmitter. This signal is translated into a pneumatic signal through a nozzle-baffle unit indicated generally at 11.

A pulse frequency producing arrangement is indicated generally at 12 and leads to a fluid logic unit counter as at 13.

In a parallel alignment with the counter there is provided a register section indicated generally at 14, with units lined up respectively with the units of counter unit 13. Between the counter 13 and the register 14 there is a pass and clear system, indicated at 15, to control the transfer of information of the counter 13 to the register 14 and to clear the counter 13.

Below the register 14 and again with individual units aligned respectively with the units of the counter and the register is an integrating unit 16, with individual bellows positioned at different distances along a pivot bar. The different distances along the pivot bar of the different bellows are selected for compatible relationship to the related elements in the counter 13, on a binary basis.

Throughout the system there are circle indications P as power fluid sources for all of the various units involved. These may be connected to a single source if desired but for the purposes of clarity in the drawing are shown individually.

At the upper left of the drawing, in the frequency producing section 12, there is a fluid whistle type of device 17. When supplied from its power source 18 it produces fluid pulses, usually pneumatic, and usually air throughout this device, at a predetermined frequency or frequency pattern for the purpose of applying this known frequency situation to the counter 13.

In the signal input unit 11 there is provided a nozzle 19 and a baffle 20 mounted on a flexure 21 in such fashion that when the input electrical signal is applied to an input coil 22, the baffle 20 is drawn toward the nozzle 19 in restrictive fashion, to provide a back pressure as derived from its power source 23 and through the usually nozzle-baffle restrictor 24, with the back pressure in an output passage 25 as a control signal.

In the counter unit 13 each of the logic units are identical and each operate in oscillator flip-flop fashion changing state with each new pulse.

In this counter unit operation, referring to the first counter unit at 26, as an example, is provided with a power source at 27 which provides a flow in either one of two outputs 28 or 29 in a flip-flop bi-stable fluid logic unit situation. The pulsing input is applied to an input passage 30. By the nature of the device the flow from the power source 27 is, as a starting state, either in the output passage 28 or in the output passage 29. It is customary to set it up as being in the output passage 28 as a zero condition for this binary counter unit 26. This being so, the divided input control passage, as indicated at 31, has a back flow in a clockwise fashion because of the differential pressures evoked when the output is stabilized in the output passage 28 as indicated. Thus when the next or first operating pulse comes in the input passage 30, it meets a clockwise flowing stream and follows it to flip the output from the passage 28 to the passage 29.

Accordingly, the first input pulse in the unit 26 will produce a binary "one" output from this unit. This output is in passage 29 leading to the register section 14 and in particular the first unit thereof indicated at 32.

This signal holds and is not effective in the register because the pass and clear system 15 is not in operation during the counting of the unit 13, as will be seen hereafter.

In the counter 13 the first pulse produces a "one" output in the unit 26, and the other units remain at their initial state of zero. The second pulse produces a zero in the first unit and an output in the passage 28 leading to the second counter unit to produce a "one" output in it. This counting situation continues serially in a binary fashion. The counter 13 is provided with as many units as necessary for the particular application involved and it continues to count as long as the telemeter input pulse lasts. It starts its count when the signal begins and terminates its count when the signal ends.

The register system 14 is made up of arrangements of bi-stable fluid logic flip-flop units in a series indicated at 33 and mono-stable flip-flop units in a series indicated at 34.

In the absence of an input pulse to this device or at a pre-determined artificial zero as desired, the nozzle-baffle input arrangement at 11 is so located that power from the source 23 flows out through the nozzle 19 without undue restriction from the baffle 20 so that there is no effective back signal in the output 25 thereof. Since this is true there is a control signal from the power source 25 through a mono-stable flip-flop 36 to control another mono-stable flip-flop 37 in terms of causing it to vent through an output 38 thereof. Thus the constant flow from the frequency producing system from source 18 through the frequency provider 17, is constantly vented through the output 38 while there is no input signal to the overall device. At the same time, the same output from the power source 35, through the mono-stable flip-flop 36 and through another passage 39, provides a control which maintains the pass and clear situation out of operation.

The pass and clear system 15 is primarily driven from power source 40 through a mono-stable flip-flop 41. A mono-stable flip-flop in this context holds to a straight through flow except when the controlling signal is applied. It then flips over to the other output, without wall holding there and when the control signal is removed it returns to its original, straight through state.

As long as there is no input signal at 10 there is a signal from the source 35 as a control for the mono-stable flip-flop 41 so that flow from the power source 40 is through output passage 42.

In the operation of this device it will be seen hereafter that when a step signal is put in the input 10 the known frequency situation from the source 18 to the frequency producer 17 is applied to the counter. This is accomplished by achieving a back pressure from the nozzle 19 due to the restriction thereof by the flapper 20, which vents the mono-stable flip-flop 36 through its output 43. This removes a control signal from the mono-stable flip-flop 37 so it returns to its initial state and allows the frequency from the source 18 to be applied to the first counter unit 26 by way of input passage 30. This condition remains as long as the input signal lasts.

When the input signal at 10 ends, the counter stops because unit 37 is vented. A signal is also applied to unit 41 to activate the pass and clear system 15.

The pass and clear system is energized by the control signal in the passage 39 to the mono-stable flip-flop 41 so that power from the source 40 now flows into the pass and clear system by way of the passage 42.

There are two delays in the pass and clear system 15, one at 45 and one at 46. The delay at 45 prevents any action by the pass and clear system until the effect of the input signal ending has settled out. The delay 46 provides a longer delay than that of 45 and establishes a time when the device will clear the counter after the "pass" action. The "clear" action is applied individually to each of the units of the counter 13 and resets them to a zero condition where necessary in anticipation of the next forthcoming measured signal.

The pass and clear control action proceeds through the operation two mono-stable flip-flop units, one exemplified at 47 and one exemplified at 48, followed by a bi-stable flip-flop exemplified at 49.

The power that is used in the pass and clear circuit 15 proceeds from source 50 which ordinarily vents through mono-stable flip-flop outlet 51 until it is so controlled as to be put into operation. The control for this flip-flop 48 to provide a signal in its operating output 52 Thus the delay 45 temporarily holds off the operation of the mono-stable flip-flop 48 and thereafter operates the flip-flop 48 to provide a signal in its operating output 52 to proceed through a bi-stable flip-flop 49 to the pass output thereof as at 53. Thus the power signal is led individually to each of the mono-stable flip-flops in the series 34.

The bi-stable flip-flop 49 is already established with a control signal in input passage 54 from the source 40 so that when the flip-flop 48 is actuated after the delay 45, the control signal in input passage 54 is waiting for it and it is made to flow in the pass output 53.

Thereafter when the delay 46 has been accomplished the signal, normally going straight through mono-stable flip-flop 47 to control 54, is now shifted to another output as at 55 which shifts bi-stable flip-flop 49 to the clear output 56. This terminates the pass situation and establishes a clearing signal in each of the counter units 13 to ensure a zero condition in each, ready for the next input telemeter signal.

In the pass situation note that each one of the units of the counter 13 has an output which is either "one" or zero on the binary code system. This signal is waiting in the various counter unit outputs as at 29 and similarly in the others at the series 34 mono-stable flip-flops, for example 57.

Considering the first register unit 32, when its related counter unit binary output is zero and when the pass signal is applied to the passage 53, the pass signal goes straight through the mono-stable flip-flop 57. This provides a control signal for the bi-stable flip-flop 58 which causes the output from the power source 59 to vent as at 60. If there is a signal in the passage 29 to be passed from the first counter unit, the mono-stable flip-flop 57 has its output shifted to passage 61. This reverses the control on the bi-stable flip-flop 58 to put its output in passage 62 leading to a unit 63 in the form of a diaphragmed chamber which variably restricts a nozzle 64. This nozzle-flapper system operates from the power source 65 through restrictor 66 to the nozzle 64, with a back signal passage to a bellows 67.

The bellows 67, like the others, each for one of the counter units, is spaced along a lever 68 pivoted as at 69. The distances of the bellows from the pivot, and the sizes of the bellows, are related to the binary situation of the specific counter unit so that as the binary units progress; 1, 2, 4, 8, the representative bellows on the arm 68 are similarly at greater distances and forces away from the pivot point 69.

When the count has been completed, and the transfer made to the register, various signals appear in various bellows of the pivot arm 68, a signal perhaps in the first bellows and not in the second or otherwise, according to the binary situation. These signals are integrated to tilt the bar on the opposite side of the pivot in restrictive fashion with respect to a nozzle 70.

This nozzle-baffle arrangement is supplied from power source 71 through a restrictor 72 to provide a back pressure in passage 73 as an operating output which is also applied to a bellows 74 in a balancing action with respect to the lever arm 68 and the other bellows. The output pressure in the passage 73 is an integrated representation of the various pressures in the bellows to the right of the pivot 69 and in total a representation of the duration of the original input signal.

The diaphragm units such as 63 are vented, when the counter unit is cleared, through the various vents of the bi-stable flip-flop series 33 as illustrated by the vent 60 in the unit 58.

This invention therefore provides a signal duration measurement device on a fluid logic no moving parts continuous flow basis wherein a pre-determined pulse frequency situation is applied to a counter for a time determined by specific pre-determined beginning and ending functions as determined or established. A binary situation of the counter thus established transferable to a fluid logic register after the counting is completed automatically on a preset basis and the counter thereafter cleared with the register transferring its information to a bellows, pivot arm, nozzle-baffle fluid integrator to provide a fluid output signal of a value representative of the duration of the initial input signal and therefore representative of the measured variable value at the transmitter location of the telemeter system.

As many embodiments may be made of the above invention, and as changes may be made in the embodiments set forth above without departing from the scope of the invention, it is to be understood that all matter hereinbefore set forth or shown in the accompanying drawing is to be interpreted as illustrative only and not in a limiting sense.

I claim:

A fluid logic telemeter receiver signal duration measuring device comprising a fluid logic digital counter, means for applying fluid pulses at known frequency to said counter, means operatively connecting and disconnecting said pulse frequency means to and from said counter in response to a selected beginning and ending of a signal to be measured, fluid logic digital register means associated with said counter, means for transferring the information of said counter to said register after said measurement, and pneumatic bellows force balance digital to analog converter means responsive to the information in said register.

References Cited by the Examiner

UNITED STATES PATENTS

| 3,081,942 | 3/1963 | Maclay | 235—201 X |
| 3,093,306 | 6/1963 | Warren | 235—201 |

OTHER REFERENCES

Gray et al.: "Fluid Amplifiers," Control Engineering, February 1964, pages 57–60.

Boothe et al.: "Fluid Amplifier Circuit," Fluid Amplification Symposium, Diamond Ordnance Fuze Labs., Washington, October 1962, pages 441–447.

LEO SMILOW, *Primary Examiner.*

W. F. BAUER, *Assistant Examiner.*